Dec. 21, 1943.    H. B. BABSON    2,337,024
COUPLING APPARATUS
Filed Dec. 13, 1941
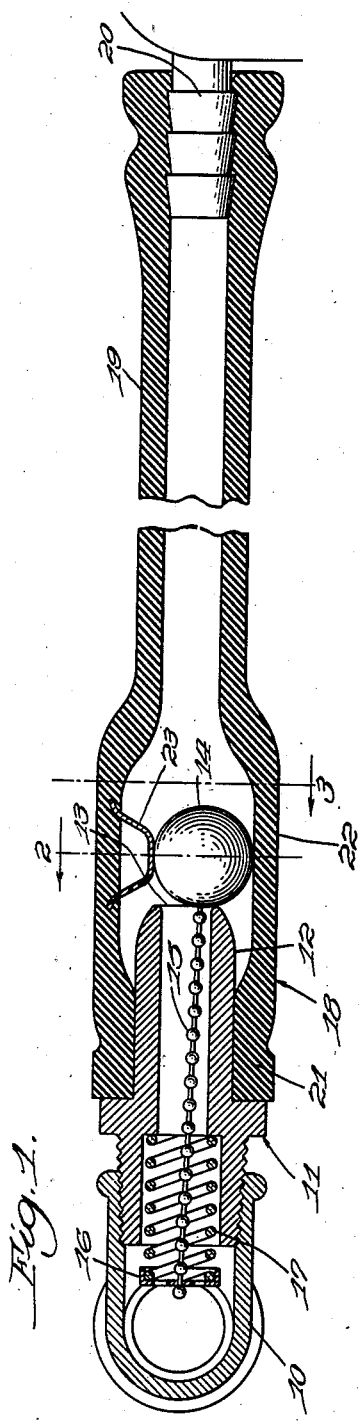
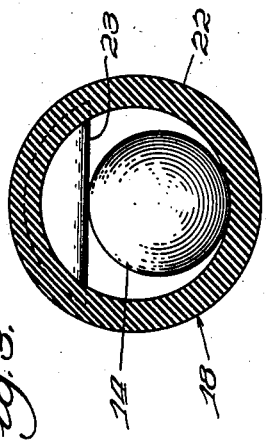
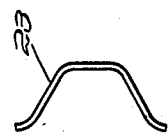
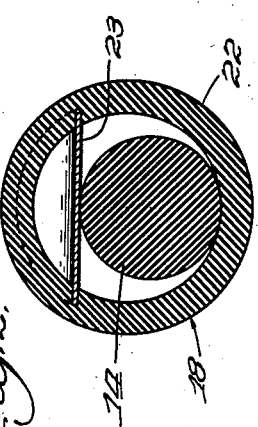
Inventor:
Henry B. Babson
By Chritton, Wiles, Davies & Hirsch
Attys.

Patented Dec. 21, 1943

2,337,024

UNITED STATES PATENT OFFICE 2,337,024

COUPLING APPARATUS

Henry B. Babson, Chicago, Ill., assignor to Babson Bros. Co., a corporation of Illinois Application December 13, 1941, Serial No. 422,911

4 Claims. (Cl. 284—13)

This invention relates to coupling apparatus, and more particularly to means for conveniently coupling a milking machine to a vacuum line.

One feature of this invention is that it provides very convenient means for coupling a device to a fluid line, as a milking machine to a vacuum line; another feature of this invention is that the operation of effecting coupling automatically opens a normally closed opening and renders the vacuum effective to operate the milking machine; still another feature of this invention is that removal of the coupling causes the opening to be automatically closed, preventing loss of vacuum; a further feature of this invention is that it may be simply and readily manufactured; other features and advantages of this invention will be apparent from the following specification and the drawing, in which:

Figure 1 is a sectional view, partly broken away, of coupling apparatus embodying my invention; Figure 2 is a transverse sectional view along the line 2 of Figure 1; Figure 3 is a transverse sectional view along the line 3 of Figure 1; Figure 4 is a perspective view of a metal disc before it is formed; and Figure 5 is an elevational view of the disc after it is formed into desired shape and before it is fastened to the coupling apparatus as shown in Figures 1, 2 and 3.

In order to provide operative fluid for a device designed to be operated thereby, it is quite common to have a line or pipe with a number of terminals at different places, so that the device may be conveniently attached to the line at different locations. One example is the operation of milking machines from vacuum lines, and the coupling apparatus here disclosed and claimed by me has been particularly designed for and is particularly adapted for use in connection with milking machines.

In a modern dairy barn a pipe or vacuum line is run along the wall adjacent the cows' stalls, and is provided with means for pulling a vacuum in the line, as a vacuum tank and pump. The vacuum line is also provided with terminals, generally at each stall, these terminal units now customarily being in the form of stall cocks. In order to render his milking machine operative the farmer must not only force a coupler or tube onto the end of the stall cock, but must turn the cock to on position; and he must remember to turn it to off position when he removes his coupling, or vacuum is wasted. My invention provides a combination of a terminal unit and coupler which may be merely pushed onto or pulled off of the terminal unit, and wherein the arrangement is such that opening and closing of the valve is automatic, with no necessity of turning a cock handle. While I have devised the coupling apparatus disclosed herewith for use with milkers of the kind shown in McCornack Patent 1,859,213, it is equally adaptable for use with any conventional type of milking machine, since all of the milkers now on the market are operated by vacuum.

Referring now more particularly to the drawing, and to the specific embodiment of my invention illustrated, the pipe or vacuum line is provided at intervals with a T, one of these being shown and indicated as 10. The T has fastened to it, as by being threaded into it, a terminal unit 11 of rigid material, as metal or hard rubber. The terminal unit comprises a portion adapted to be threaded into the T, and a substantially cylindrical male portion extending therefrom, this latter portion being here indicated as 12. As can be seen in Figure 1, an axial bore extends through the terminal unit, providing an opening 13 at the outer end of the cylindrical portion. A valve member is provided for closing the opening, this preferably being a ball, and being here shown as a ball 14 of resilient material, as rubber, it being understood that a hard ball, as one of metal or glass, could be used in combination with an appropriate seat. Means for normally maintaining the valve member or ball 14 in closed position (that is, in a position wherein the opening 13 is closed) is provided, this being in the form of a chain 15 connected to the ball at one end and to a member 16 at the other end, and a spring 17 operating on the member and thus through it and the chain to urge the ball toward closed position.

Whenever there is no other factor preventing it, therefore, the ball 14 will move to closed position over the end of the terminal unit. Since this terminal unit is being used with a vacuum line the vacuum assists the spring 17 in holding the ball in position over the opening 13 and in providing a good seal, so that no vacuum is lost. Whenever the ball is displaced from its normal position concentric with the opening 13, however, the terminal unit is opened and the vacuum is operative upon any device which may be connected to the terminal unit.

In order to provide such connection and displacement of the ball, a coupler 18 is adapted to be slipped onto the cylindrical male portion of the terminal unit. It will be understood that this coupler may be formed integral with the hose 19 connected at its other end to a nipple 20 on the milking machine; or the coupler may be a separate unit to which the hose is connected. In any event, the coupler is preferably of yielding or resilient material, as rubber; and it is provided with a part 21 adapted to snugly engage the male cylindrical portion of the terminal unit, and another portion 22 having an enlarged internal diameter providing a chamber for movement of the ball 14. It will be understood that this chamber is not necessary except where the diameter of the ball approaches that of the male portion of the terminal unit.

In order to displace the ball from closed position a disc or plate 23 is fastened in position in the coupler, as by being molded into the walls thereof when the coupler is made of rubber. In the preferred method of manufacturing my coupling apparatus a flat sheet metal disc (as illustrated in Figure 4) is stamped or otherwise formed to the shape shown in Figure 5, and then held in appropriate position while the coupler 10 is being molded, so that the edges of the disc are molded into the walls of the coupler.

With coupling apparatus of the kind shown here conventional stall cocks may be completely eliminated. When a farmer desires to milk a particular cow he need only push the coupler onto the cylindrical portion of the terminal unit, approximately to the position shown in Figure 1, the metal plate 23 displacing the ball 14 to provide for passage of air through the opening 13 and the terminal unit, the air then continuing along the pipe, the vacuum thus pulled in the milker effecting its operation. When the milking is completed the farmer need only pull the coupler off the terminal unit (and he can do this right from the milker, without stepping back to the wall, where the coupler and hose are integral), the ball then being pulled back to a position where the opening 13 is closed.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Coupling apparatus for a fluid line, including: a terminal unit comprising a cylindrical portion having an opening at one end thereof; a movable valve member adapted to close the opening, said member being mounted on the outside of said unit; yelding means for normally maintaining the valve member in closed position; a coupler having a cylindrical portion adapted to frictionally engage said unit; and means carried by the coupler for moving the valve member to one side to uncover said opening when the coupler is in coupling engagement with the terminal unit.

2. Coupling apparatus for a fluid line, including: a terminal unit comprising a cylindrical male portion of rigid material having an opening at one end thereof, the end portion adjacent said opening being tapered; a ball adapted to close the opening, the ball being mounted on the outside of said unit; yielding means for normally maintaining the ball in closed position over the opening; a coupler comprising a cylindrical female portion adapted to slip onto and snugly engage said cylindrical male portion; and means comprising part of the coupler for moving the ball to one side to uncover said opening as the female portion is slipped onto the male portion of the terminal unit.

3. Coupling apparatus for a fluid line, including: a terminal unit comprising a cylindrical male portion of rigid material having an opening at one end, the end portion adjacent said opening being tapered; a ball adapted to close the opening; yielding means for normally maintaining the ball in closed position over the opening and on the outside of said terminal unit; a coupler comprising a cylindrical female portion of resilient material having a part adapted to slip onto and snugly engage said male portion, and a part of larger internal diameter adjacent the end of the male portion; and means in the coupler for moving the ball to one side out of closed position as the female portion is slipped onto the male portion of the terminal unit.

4. Coupling apparatus for a vacuum line, including: a terminal unit of rigid material comprising a cylindrical portion having an opening at one end thereof; a movable valve member adapted to close the opening, said member being mounted on the outside of said unit; yielding means for normally maintaining the valve member in closed position; and a coupler comprising a cylindrical portion of resilient material having a female part adapted to slip onto the cylindrical portion of the terminal unit and to engage one side of the valve member to move it to one side to uncover said opening when the coupler is in coupling engagement with the terminal unit.

HENRY B. BABSON.